Figure 1:
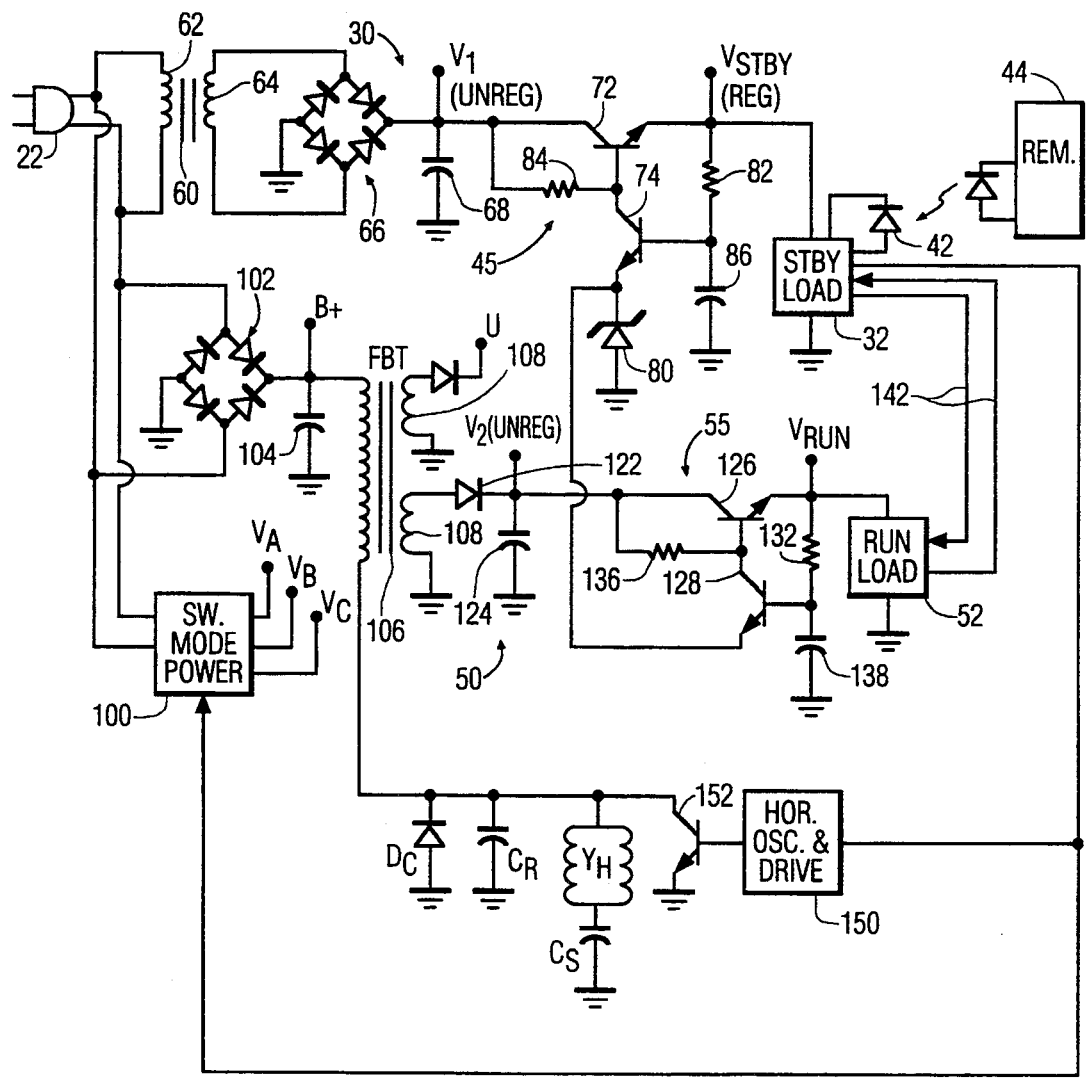

United States Patent [19]

Dinwiddie et al.

[11] Patent Number: 5,353,215
[45] Date of Patent: Oct. 4, 1994

[54] TRACKING RUN/STANDBY POWER SUPPLIES

[75] Inventors: Aaron H. Dinwiddie; William J. Testin, both of Indianapolis, Ind.

[73] Assignee: Thomson Consumer Electronics, Inc., Indianapolis, Ind.

[21] Appl. No.: 162,817

[22] Filed: Dec. 6, 1993

Related U.S. Application Data

[63] Continuation of Ser. No. 890,640, May 29, 1992, abandoned.

[51] Int. Cl.$^5$ ............... H02M 7/23; H01J 29/70; H04N 5/63
[52] U.S. Cl. ................... 363/65; 363/67; 323/281; 323/267; 378/190; 315/411
[58] Field of Search .............. 323/267, 269, 281; 363/65, 67, 89, 70; 378/190; 315/411

[56] References Cited

U.S. PATENT DOCUMENTS

| | | | |
|---|---|---|---|
| 3,496,450 | 2/1970 | Thiele | 323/15 |
| 4,189,670 | 2/1980 | Tanahashi | 323/9 |
| 4,291,257 | 9/1981 | Böhringer | 315/408 |
| 4,500,923 | 2/1985 | Duvall et al. | 358/190 |
| 4,641,064 | 7/1986 | Testin et al. | 315/411 |
| 4,644,251 | 2/1987 | Rathke | 323/267 |
| 4,651,214 | 3/1987 | Rodriguez-Cavazos | 358/190 |
| 4,656,399 | 4/1987 | Testin et al. | 315/411 |
| 4,712,171 | 12/1987 | Yamashita | 363/142 |
| 4,761,723 | 8/1988 | Lendaro | 363/21 |
| 4,829,216 | 5/1989 | Rodriguez-Cavazos | 315/411 |
| 4,994,719 | 2/1991 | Lendaro | 315/411 |
| 5,036,261 | 7/1991 | Testin | 315/411 |
| 5,189,600 | 2/1993 | Keck et al. | 363/212 |

Primary Examiner—Steven L. Stephan
Assistant Examiner—Adolf Berhane
Attorney, Agent, or Firm—Joseph S. Tripoli; Joseph J. Laks; Harvey D. Fried

[57] ABSTRACT

A power supply for a television apparatus, comprises a first source of unregulated DO run voltage operable only in a run mode of operation and a second source of unregulated DO voltage operable in a standby mode and in the run mode of operation. A first regulator responsive to the first source unregulated DO run voltage produces a first regulated voltage. A second regulator responsive to the second source of unregulated DO voltage produces a second regulated voltage. First and second integrated circuits are energized respectively by the first and second regulated voltages. At least one of the integrated circuits has a signal output coupled to a signal input of the other of the integrated circuits. A controller is operable in the run mode and responsive to variations of one of the regulated voltages for adjusting the other of the regulated voltages to follow the variations. Each of the regulators may comprise a series pass transistor and a control transistor coupled to a base of the series pass transistor. Each of the control transistors provides a control current. The controller can be responsive to both control currents for adjusting the regulated voltages to track one another. The control circuit may sum the control currents.

13 Claims, 3 Drawing Sheets

TRACKING RUN/STANDBY POWER SUPPLIES

This application is a continuation of application Ser. No. 07/890,640, filed May 29, 1992, and now abandoned.

The invention relates to voltage regulated power supplies for television apparatus and the like, having a standby power supply for powering certain loads when the apparatus is substantially inactive, and a run power supply for operation of other loads when the apparatus is active. The invention couples the regulation circuits of a separate run supply and standby supply so the standby supply accurately tracks the run supply in the run mode, and thereby ensures that signal lines and the like driven from circuits on one of the two supplies remain at levels that are within specifications for circuits on the other of the two supplies.

Televisions, video recorders and the like, herein generally termed television apparatus, often include circuits which must remain energized when the television apparatus is turned off, i.e., not producing a raster display. For example, instant-on circuits, clocks and timers, remote controls having on/off power switching capability, sophisticated control or tuning functions, digital memories and the like, may all need to be powered continuously. Typically, these elements are powered so long as the television apparatus is coupled to energized AC mains, and optionally for a further limited time by a battery.

In the run mode, the television apparatus can be powered from the horizontal deflection circuits and the flyback transformer, operative during horizontal scanning. A standby power supply is provided for powering the standby loads when not scanning, i.e., when in standby. It is also possible to employ a switched mode power supply, which preferably operates at the horizontal rate in the run mode, and is free running in standby. The switched mode power supply can be switched between operation in run and in standby, to accommodate different current requirements as well as to disable certain voltage outputs when in the standby mode, namely those coupled to the run loads.

Typically the standby supply has a transformer with a primary winding which is non-switchably coupled to the power plug of the apparatus, and a secondary winding coupled to the input terminals of a rectifier such as a full wave bridge. The output terminals of the rectifier are coupled to a storage or filter capacitor which is charged to an unregulated voltage level related to the AC mains voltage by the turns ratio of the transformer. A voltage regulator is coupled to the filter capacitor and regulates the supply voltage applied to those loads which are to remain constantly powered, i.e., the standby loads.

The standby loads typically are control circuits and may include integrated circuits (ICs) such as microprocessors, random access memories and the like. A remote control receiver may be provided to monitor constantly for a startup signal, for switching from the standby mode to the run mode. It is possible to deactivate the standby power supply or to block all or part of the current from the standby power supply when switching into the run mode. Many television apparatus, however, use the standby power supply to power the standby loads when in the run mode as well as in the standby mode. In that case, the run mode loads (i.e., the loads which are not powered in standby) are powered by one or more separate power supplies, for example from the switched mode power supply associated with the horizontal deflection circuits.

It is desirable to minimize the number of loads which are powered by the standby supply, to reduce unnecessary power consumption as well as the cost of the components needed (especially the cost of the standby power supply transformer), and to reduce stress on the standby power supply components. Control circuits which do not have to be powered in the standby mode are powered from the run supply. However, providing different power supplies for some of the control circuits than for others causes a problem because the separately powered control circuits are coupled to one another. The control circuits used in run and in standby communicate with one another over common signal lines when in the run mode. It is necessary to cause the run and standby regulated voltages to remain substantially equal. However, this can be a complicated problem because the loading of the standby and run supplies varies greatly.

A standby supply, for example at 5 VDC, may need to supply only 40 mA of current. The run supply at the same voltage may need to supply current up to 1 A. A fundamental problem with known schemes for maintaining equal regulated voltages for the run and standby supplies is that variations in the base-emitter voltage of the regulating transistor of the run supply is on the order of 200 mV.

Control circuits such as CMOS integrated circuits are suitable for fast switching characteristics and reliable long term performance. Large scale integration of CMOS circuits, and in particular microprocessor control of television apparatus, is used widely. It is a characteristic of CMOS circuits that where commonly connected circuits are powered from different power supplies, the voltage regulation of the respective supplies becomes critical. A problem known as SCR latching can be caused by exceeding the tolerance of a CMOS circuit for differences between the VDD supply for the IC and the maximum voltage applied to the inputs of the is SCR latching can occur because the supply voltage coupled to a first IC in a common communication path produces a signal on its output that exceeds the supply voltage coupled to a second IC having an input coupled to the output of the first IC. This problem is discussed, for example, in U.S. Pat. No. 5,036,261—Testin, which is hereby incorporated.

It is possible to couple ICs which operate at different reference voltages via level shifting circuits. However, it is more desirable to directly couple the respective outputs and inputs, and to use the same reference voltage to power the ICs. A circuit with some ICs coupled to the standby supply and others coupled to the run supply, wherein respective input and output signal lines are coupled, for example, over a communications bus, needs some provision to ensure that the supply voltages are equal.

Most CMOS integrated circuits in production specify a maximum input pin voltage of VDD+0.3 V, to guarantee that the integrated circuits will operate as specified. At greater than VDD+0.3 V, unguarded flip-/flops, RAM cells and other integrated functions may change state and cause anomalous operation, or an SCR latch may occur which blocks further operation of the affected circuit until the power is turned off.

Unfortunately, variations in components and conditions are such that the typical voltage regulator cannot be expected to match the nominal output voltage, or even if made manually adjustable by a potentiometer or the like, indefinitely to maintain the nominal output voltage to the required tolerance. A typical series regulator uses a series power transistor having a collector coupled to the unregulated voltage input, and a base coupled to a reverse biased Zener diode and by a resistor to the unregulated input. The voltage across the Zener diode defines a reference that in conjunction with the base-emitter voltage drop determines the regulated output voltage on the emitter of the power transistor. Assuming two CMOS integrated circuits driven respectively from a 5 V run supply and a 5 V standby supply, and assuming that both have Zener diodes of 5% tolerance, one of the supplies may regulate to 5.25 V and the other to 4.75 V. The difference, namely 0.5 V, is enough to violate the VDD+0.3 V maximum input voltage rule.

It is possible to use the regulated level of one power supply to affect the regulation of another power supply. Circuits of this type may require potentiometers to set the coupling between the supplies when the apparatus incorporating the supplies is manufactured. Potentiometers can be expensive. Furthermore, the optimal relationship between the two regulators may be affected by the current loading of one supply or the other. Where the current loading of a series regulated supply is increased, the base-emitter voltage of the series pass transistor in the regulator increases. The loading thus produces a load-dependent variation between the emitter voltage (i.e., the regulated output) and the base of the series pass transistor, which typically is coupled to a reference voltage element.

When temperature drift tolerance as well as the Zener nominal tolerance are factored together, the regulated supply voltage easily can vary by ten percent. Using the nominal 5 V supply voltage example, an input to a CMOS circuit coupled to the lower supply voltage, driven by an output from a CMOS circuit coupled to the higher supply voltage, could exceed the lower VDD by one volt. When one further considers the variations resulting from loading-induced variations in the base-emitter voltage of the run supply regulator, anomalous operation or a potential SCR latch becomes quite a problem.

U.S. Pat. No. 5,036,261—Testin recognizes the problem of variations between two supply voltages which power different integrated circuits whose signal lines are coupled. The problem is addressed by providing only one voltage regulator, to which the unregulated run and standby voltages are coupled at a summing junction. A common supply voltage is thereby obtained, and in the run mode powers both the run and standby loads at the same voltage. Switching means are provided to decouple the run mode loads from the regulator when in standby. The unregulated run supply voltage is derived from the horizontal deflection circuits and is higher than the unregulated standby supply voltage. The unregulated run supply voltage is coupled to the summing junction by a diode which is forward biased in the run mode and reverse biased in standby. The run supply effectively overpowers the standby supply when in the run mode, and as a result, the run supply takes over for supplying power to the standby loads (in addition to the run loads) when horizontal deflection commences. While this solution avoids a variation between the supply voltages to run mode loads and standby loads when in the run mode, it does not take advantage of the standby voltage source when in the run mode.

According to the present invention, the standby power supply is used to power the standby loads in both the standby mode and in the run mode. A separate series pass regulator is provided for each of the run supply and the standby supply. By feeding back the regulated output voltage of the run supply to the regulator for the standby supply, the regulated output voltage of the standby supply is caused to track the regulated output voltage of the run supply, thereby powering all the control circuits at the same VDD level in the run mode, even if loading, temperature variation or component variation causes the VDD level to be other than nominal.

Feeding back the output voltage of a series regulator is known in connection with reducing the power dissipation of the regulator. In U.S. Pat. No. 4,651,214—Rodriguez-Cavazos, the base of a Darlington coupled series pass regulator is coupled to the anode of a reference Zener diode through a feedback transistor. The collector of the feedback transistor is coupled to the base of the Darlington circuit through a resistor, and the emitter of the feedback transistor is-coupled to the anode of the Zener diode. The base of the control transistor is coupled to a voltage divider in parallel with the regulated output voltage. Accordingly, feedback of the regulated output voltage controls current to the Zener diode. This feedback operates only to reduce dissipation in the run supply. No provision is made to guard against a variation between the regulated output voltages of the separate standby and run supplies.

It is an aspect of the present invention to enjoy the efficiencies of separate standby and run power supplies, the standby supply powering its loads in both the run and standby modes, while ensuring that the separate supplies produce regulated output voltages that are substantially equal.

It is a further aspect of the invention to ensure equal output voltages for the two supplies by regulating the standby supply output voltage using a feedback signal from the run supply voltage.

It is another aspect of the invention that separate series regulators for run and standby power supplies are coupled to a common reference Zener diode via feedback transistors coupled between a respective regulated output of the power supplies and the Zener diode, such that the run and standby supplies regulate separately but track one another in regulated output voltage.

These and other aspects are found in a television, VCR or similar device having a separate voltage regulator for the standby power supply, which is always on, and the run power supply, which is on only during regular operation. The separate regulators are coupled to unregulated DC sources and power circuits such as CMOS integrated circuits, which have input and output signal lines coupling elements powered from the two different regulators. To avoid problems associated with the input to a circuit exceeding the supply voltage to the circuit, the separate run and standby regulators are coupled to track one another. The standby regulator and the run regulator are coupled via a feedback path from a regulated DC voltage produced by one of the standby regulator and the run regulator to the other. The run regulator and the standby regulator can be series pass regulators including a control transistor coupled between a base of a series pass transistor and a voltage reference, the base of the control transistor being coupled to the regulated output for internal feedback for the respective regulator. The currents provided by the control transistors for the two regulators are summed and coupled to a reverse biased Zener diode providing a common voltage reference for both regulators and causing them to respond substantially the same to loading, which may vary differently between the run loads and the standby loads.

Figure 2:
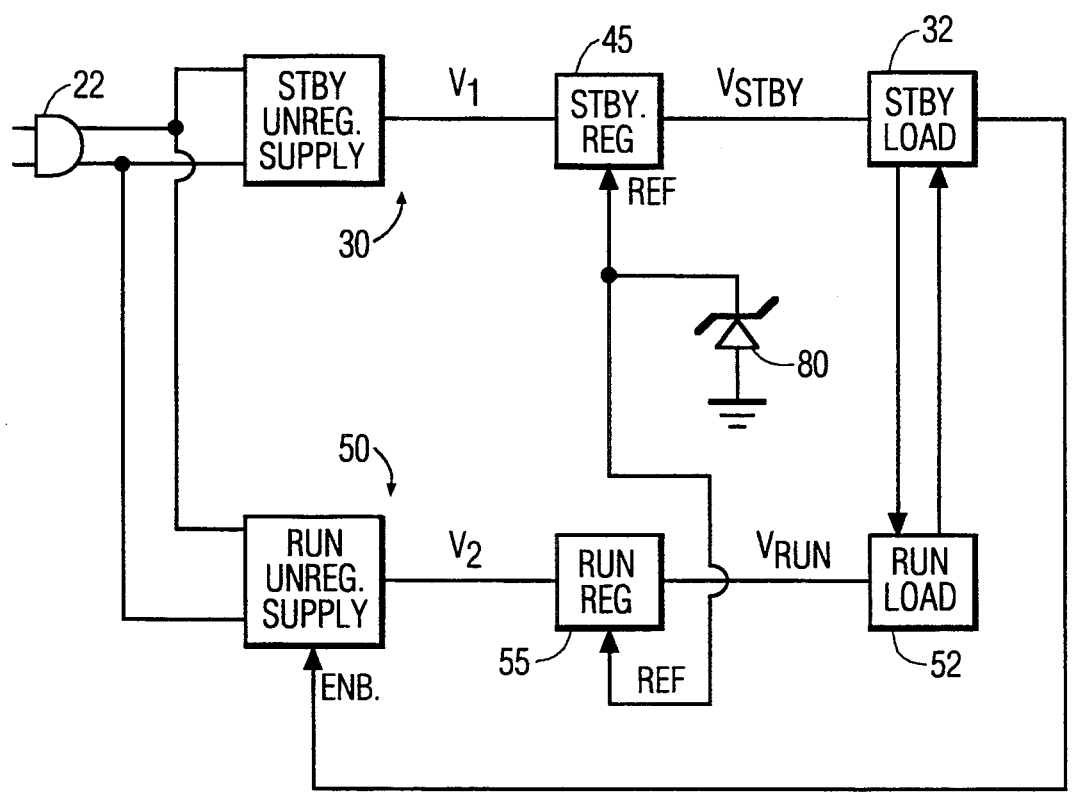
Figure 3:
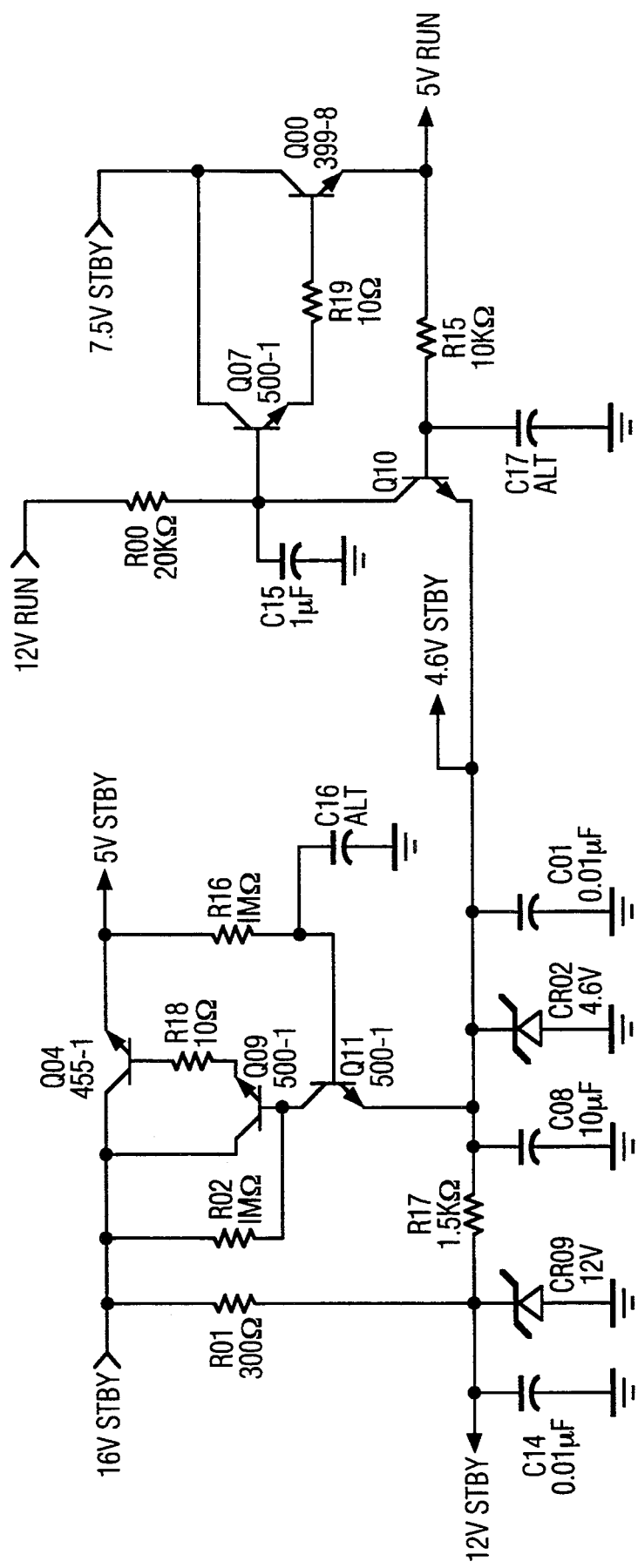

In the exemplary embodiments shown in the drawings, FIG. 1 is a simplified schematic diagram illustrating the invention as applied to a television;

FIG. 2 is a schematic block diagram showing the relationship of the standby (STBY) and run power supplies and loads according to the invention, with inputs shown as left-facing arrows and outputs as right-facing arrows; and, FIG. 3 is a partial schematic diagram showing a preferred embodiment of the standby/run voltage regulators according to the invention.

In FIG. 1, the television apparatus is powered from AC mains, typically wired to a plug 22 inserted in a wall outlet which is always energized. When the television is "off," i.e., not receiving or displaying a signal, some elements of the apparatus are still powered from the AC mains by the standby power supply 30. Without limitation, examples of circuits which remain powered in the standby mode are instant-on circuits, clocks and timers, remote controls having on/off power switching capability, sophisticated control or tuning functions, volatile digital memories and the like. For purposes of illustration, such circuits are represented in FIG. 1 by standby Icad 32, which comprises an infrared receiver 42 responsive to a remote control 44. These same circuits are also powered in the run mode, but according to the invention the circuits are segregated into standby loads, powered from the standby regulator 45, and run loads, powered from a separate run regulator 55.

Means are provided for generating an unregulated DC standby voltage V1 whenever the television apparatus is coupled to active AC power mains, and a standby regulator 45 is coupled to the unregulated DC standby voltage V1, operable to produce a regulated standby voltage VSTBY. The particular regulated voltage may be, for example, 5 VDC, as appropriate to power CMOS integrated circuits and the like. A standby transformer 60 has a primary winding 62 coupled across the AC mains, and a secondary winding 64 coupled to a rectifier such as full wave bridge rectifier 66. Fuses, chokes, current limiting resistors and the like can be included, but are not shown to avoid overburdening the drawing. The full wave rectified output of the bridge rectifier 66 is coupled to a filter capacitor 68, which charges to the unregulated voltage V1. This voltage is somewhat higher than the desired regulated voltage, providing sufficient range for regulation. V1 can be, for example, 12 to 16 V for obtaining a regulated output voltage of 5 V.

The unregulated voltage V1 is coupled to the collector of a series pass transistor 72 of the standby regulator 45. This transistor 72 conducts sufficient current to maintain the voltage at its emitter at the desired output level, being controlled by a feedback or control transistor 74 and a Zener diode 80 in series. The base of the feedback or control transistor 74 is coupled to the regulated output VSTBY through feedback resistor 82. The collector of the feedback or control transistor 74 is coupled to the base of the series pass transistor 72 and to resistor 84, which biases the circuit, providing current from the unregulated supply voltage. A filter capacitor 86 is coupled between the base of feedback transistor 74 and ground.

The emitter of the feedback-control transistor 74 is coupled to the anode of the reverse biased Zener diode 80, whose cathode is coupled to ground. A Zener diode has a steep current vs. voltage characteristic at its reverse breakdown voltage. The Zener 80 thus substantially defines the regulation voltage which is maintained at the emitter of the series pass transistor 72. However, control or feedback transistor 74 improves regulation by feeding back the actual level at the regulated output, making the regulator less sensitive to current loading variations which may produce a corresponding variation in the base-emitter voltage at series pass transistor 72.

Means are also provided for generating an unregulated voltage for the run regulator, active upon changing from a standby mode to a run mode. There are a number of possible techniques for generating the unregulated run voltage. For example, a power supply such as a switched mode supply 100 can be switchable so as to provide certain outputs in the run mode only, i.e., to disable certain of its outputs VA, VB, VC in the standby mode, which can then be used as unregulated run voltages.

In the embodiment shown in FIG. 1, the unregulated voltage is derived from the flyback transformer 106, which is only active during horizontal deflection. It is also possible to draw current from a "standby" supply for input to the run mode regulator, provided switched means are available to disable such current draw when in the standby mode. The invention is applicable to any voltage source which is available only in the run mode, and is to be regulated to a lower voltage.

The AC mains are coupled to a second bridge rectifier 102, the output of which is coupled to a filter capacitor 104, which charges to the B+ voltage. This voltage is coupled to the primary winding of the flyback transformer 106 and is available whenever the television is coupled to the AC mains, in a manner similar to the standby unregulated voltage. However, no current is drawn from the B+ supply unless the horizontal deflection circuits are active.

The horizontal oscillator and drive circuit 150, which drives the horizontal deflection circuit, is enabled or disabled when changing into the run mode or the standby mode, respectively. This is a convenient means for providing a run mode power supply, and is illustrated by way of example.

An output from a standby load which changes from standby to run is coupled to the horizontal drive circuit 150, which comprises a horizontal oscillator coupled to suitable synchronization means (not shown). The horizontal drive circuit is coupled to a horizontal output transistor 152, which is coupled between the primary winding of the flyback transformer and ground. According to the simplified embodiment shown, a clamping diode DC and retrace capacitor CR are coupled between the collector of the horizontal output transformer (and to the primary winding of the flyback transformer) and ground. The horizontal deflection coils YF and the trace capacitor CS are coupled in series with one another, and in parallel with the horizontal output transistor. During horizontal scanning, retrace pulses or flyback pulses occur on the primary winding of the flyback transformer and on the secondary windings 108. Various secondary windings can be employed for different purposes such as providing the high voltage output U, as well as providing unregulated run mode voltages at various voltage levels as needed.

The standby load responsive to the remote control is operable to turn the horizontal deflection circuits on (in the run mode) and off (in the standby mode). The unregulated DC run voltage is derived from one of the secondary windings 108 of the flyback transformer. A secondary winding 108 is coupled to a rectifier, shown as series diode 122, which charges filter capacitor 124 to the unregulated DC run voltage V2. A run regulator 55 is coupled to the unregulated DC run voltage V2, and is operable to produce a regulated run voltage VRUN. The run regulator 55 is similar to the standby regulator 45, namely having a series pass transistor 126 whose collector is coupled to the unregulated run voltage, and which conducts sufficient current to maintain the voltage at its emitter at the desired output level. The base of the series pass transistor 126 is coupled to a feedback or control transistor 128 and to the same Zener diode 80 which provides a reference to the standby regulator 45. The base of the feedback or control transistor 128 is coupled to the regulated output VRUN through feedback resistor 132. The collector of the feedback or control transistor 128 is coupled to the base of the series pass transistor 126 and to resistor 136, which biases the circuit, providing current from the unregulated run supply voltage. A filter capacitor 138 is coupled between the base of transistor 128 and ground.

Accordingly, the emitters of the control transistors 74, 128 for both the run and standby regulator are coupled together at a summing junction, namely at the anode of reverse biased Zener diode 80, whose cathode is coupled to ground. The Zener diode has a steep current vs. voltage characteristic at its reverse breakdown voltage. The Zener 80 thus substantially defines the regulation voltage which is maintained at the emitter of both the series pass transistors 72, 126. However, the two control or feedback transistors 74, 128 improve regulation by feeding back the actual level at the respective regulated output, and accommodate current load variations while causing the run and standby regulated output voltages to track one another.

In FIG. 1, the standby and run loads 32, 52 can be considered as two integrated circuits, one powered by the regulated standby voltage VSTBY and the other powered by the regulated run voltage VRUN. The standby and run loads 32, 52 are coupled by signal lines 142 for operation in the run mode, i.e., at least one output of one of the circuits is coupled to at least one input of the other. Whereas the standby regulator 45 and the run regulator 55 are coupled via feedback paths that cause the regulated DC voltage produced by one of the standby regulator and the run regulator to be factored into the regulation of the other, in the run mode the regulated standby voltage and the regulated run voltage track one another and remain very nearly equal notwithstanding variations in loading.

The operation of the tracking regulators can be appreciated from FIG. 2, which shows the power supply, regulation and load sections according to FIG. 1 in block form. The standby and run mode unregulated supplies 16, 18 are coupled to the AC mains 22, but the run supply can be enabled or disabled. The run supply can be a separate supply as in FIG. 1, or can be simply provided by a certain output of a switched mode power supply, for example operated by a switched mode controller. The unregulated outputs V1 and V2 are regulated by the standby and run regulators 45, 55 to produce regulated power to the respective standby and run loads 32, 52, which have coupled signal lines 142. Tracking is achieved by coupling the reference inputs to the two regulators 45, 55 together, in particular to the same reference Zener diode 80. Since the communicating load circuits 32, 52 are powered from equal voltages, the inputs to either one cannot substantially exceed its supply voltage. The load circuits remain functional, for operations in the run mode, as well as for standby operations such as switching into the run mode by enabling the run mode supply.

FIG. 3 illustrates a preferred embodiment of the invention, showing a number of run and standby supply voltages which are preferably generated for operation of various loads. FIG. 3 shows only the preferred voltage regulators, which can be coupled into the circuit in place of the simplified regulators shown in FIG. 1, including particular component values which are such as to provide a nominal 5.15 V ±3% with loading of the standby supply of about 40 mA, and the run supply up to 1 A. The run and standby supplies shown have regulated outputs that track each other to within 150 mV.

The unregulated standby supply voltage and the run voltages in this embodiment are provided by a switched mode power supply (not shown in FIG. 3) such as one controlled using a Thomson Microelectronics model TEA 2260. This circuit accommodates the very different current requirements in the run mode and the standby mode by running in a more intermittent mode when in standby than when in run, and has soft start and protective aspects useful for switching into the run mode. The unregulated standby, however, varies in output level between the standby and run modes. In the run mode, the nominal 16 V standby unregulated input to the standby regulator is at 16 V, but in the standby mode it may drop to 12 V due to action of the switched mode power supply controller. This level is still sufficient to provide regulated standby voltages of 5 V, 12 V and 4.6 V, with suitable accuracy in both the run mode and the standby mode. The current for the run mode regulator in the embodiment shown is substantially derived from the 7.5 V standby supply. However, a 12 V unregulated run supply, which appears only in the run mode, is coupled to the base of transistor Q07 via resistor R17, and enables or disables the series pass transistors Q00 and Q07 of the run regulator as a function of whether the 12 V run supply is present or not. The series pass transistor Q00 regulates the 7.5 V STBY supply to a run supply voltage of 5 V in the run mode, and does not conduct in the standby mode. The 12 V and 4.6 V standby voltages are provided from reverse biased Zener diodes CR09 and CR02, respectively, the latter being the reference Zener for the tracking regulators providing the 5 V standby and 5 V run regulated outputs. Diode CR09 is coupled by resistor R01 to the nominal 16 V unregulated standby voltage, and also by resistor R17 to the anode of Zener diode CR02. Capacitor C08 is a relatively large storage capacitor coupled in parallel with Zener diode CR02. Capacitors C01 and C14 are filter capacitors in parallel with the 4.6 V and 12 V regulated outputs.

In the embodiment according to FIG. 3, the series pass transistors are arranged as Darlington pairs, with small resistances R18, R19 coupled between the emitter of the respective Darlington transistor Q09, Q07 which is coupled to the feedback transistor Q11, Q10, and the base of the other coupled Darlington transistor Q04, Q00, which carries a greater amount of current. The small resistors R18, R19 help to roll off high frequency noise and prevent possible oscillation. A 1 μF capacitor C15 coupled to the base of the run regulator Darlington pair helps to filter out noise from the unregulated 12 V run supply, which provides a current supply to transistor Q10 through resistor R00. Current supply to the standby regulator is provided from the 16 V standby supply through resistor R02.

According to the invention the variations in base-emitter voltages for the power devices Q00 and Q04 are eliminated by feedback from the feedback transistors Q11, Q10. Only the two feedback transistors Q11, Q10 contribute to an error due to base-emitter voltage variations with changes in loading. However, the collector-emitter current for the feedback transistors Q11, Q10 is small, and is of the same order of magnitude. Therefore, variation of the regulated output voltages is minimal.

The nominal 16 V unregulated standby supply voltage can drop to about 12 V in the standby mode, and is 16 V in the run mode, which is handled by using a second Zener diode CR09 at 12 V, to regulate the voltage supplied to the 4.6 V Zener diode CR02. Zener diode CR02 is preferably a 2% Zener.

In the circuit of the invention, the regulated run and standby voltages are insensitive to almost all variations between the elements. Supply variations do not affect tracking, only the voltage offsets. Variations should be less than 2%, the tolerance of the Zener reference diode CR02. The two regulated supply voltages track within 100 to 150 mV in the worst case.

What is claimed is:

1. A power supply system, comprising:
an unswitched voltage source energized during first and second modes of operation;
first voltage regulating means energized by said unswitched voltage source for energizing a first variable load at a first regulated voltage level and generating a first control current which varies with said first variable load;
a source of a reference voltage level coupled to said first voltage regulating means for establishing said first regulated voltage level, said reference voltage level being biased by said first control current;
a switched voltage source energized only during said second mode of operation;
second voltage regulating means energized by said switched voltage source for energizing a second variable load at a second regulated voltage level and generating a second control current which varies with said second variable load; and,
said source of said reference voltage level also being coupled to said second voltage regulating means for establishing said second regulated voltage level, said source of said reference voltage level also being biased by said second control current, each one of said first and second regulated voltage levels tracking variations of the other one of said first and second regulated voltage levels.

2. The system of claim 1, wherein said first mode of operation corresponds to a standby mode and said second mode of operation corresponds to a run mode.

3. The system of claim 1, wherein said first and second voltage regulating means comprise respective active feedback circuits for generating said first and second control currents.

4. The system of claim 1, wherein said first and second voltage regulating means comprise respective comparators for generating said control currents at magnitudes related to a difference between said reference voltage level and said first and second voltage levels respectively as said first and second loads vary.

5. The system of claim 1, wherein each of said voltage regulating means comprises means for generating said respective control currents by variably diverting respective parts of respective input currents flowing into said voltage regulating means as said first and second loads vary.

6. The system of claim 1, wherein said source of said reference voltage level comprises a Zener diode, said reference voltage level varying with a sum of said first and second control currents.

7. The system of claim 1, wherein said first and second loads are interconnected integrated circuits of a kind subject to SCR latching when a difference between said voltage levels generated by said first and second voltage regulating means exceeds a tolerance, said voltage levels generated by said first and second voltage regulating means not differing from one another by more than said tolerance during said second mode of operation.

8. The power supply system of claim 1, wherein said source of said reference voltage level is biased only by said first control current during said first mode of operation and is biased by both said first and second control currents during said second mode of operation.

9. The power supply system of claim 2, wherein said source of said reference voltage level is biased only by said first control current during said standby mode of operation and is biased by both said first and second control currents during said run mode of operation.

10. A power supply system, comprising:
first voltage regulating means for energizing a first variable load at a first voltage level and generating a first control current which varies with said first variable load;
a source of a reference voltage level coupled to said first voltage regulating means for establishing said first voltage level, said source of said reference voltage level being biased by said first control current during first and second modes of operation;
second voltage regulating means for energizing a second variable load at a second voltage level and generating a second control current which varies with said second variable load, said source of said reference voltage level also being coupled to said second voltage regulating means for establishing said second voltage level; and,
said source of said reference voltage level also being biased by said second control current only in said second mode of operation, during which each one of said first and second regulated voltage levels tracks variations of the other one of said first and second regulated voltage levels.

11. The system of claim 10, wherein said first mode of operation corresponds to a standby mode and said second mode of operation corresponds to a run mode.

12. The system of claim 11, further comprising:
an unswitched voltage source for energizing said first voltage regulating means during said standby and run modes of operation; and,
a switched voltage source for energizing said second voltage regulating means only during said run mode of operation.

13. The system of claim 10, further comprising unswitched and switched voltage sources for energizing said first and second voltage regulating means respectively.

* * * * *

UNITED STATES PATENT AND TRADEMARK OFFICE
CERTIFICATE OF CORRECTION

PATENT NO. : 5,353,215

DATED : October 4, 1994

INVENTOR(S) : Aaron H. Dinwiddie; William J. Testin

It is certified that error appears in the above-identified patent and that said Letters Patent is hereby corrected as shown below:

On the Title page, under [57] "ABSTRACT", after "source of unregulated" delete "DO" and insert --DC--

On the Title page, under [57] "ABSTRACT", after "second source of unregulated" delete "DO" and insert --DC--

On the Title page, under [57] "ABSTRACT", after "first source unregulated" delete "DO" and insert --DC--

On the Title page, under [57] "ABSTRACT", after "responsive to the second source of unregulated" delete "DO" and insert --DC--

Signed and Sealed this

Twentieth Day of June, 1995

Attest:

BRUCE LEHMAN

*Attesting Officer*  *Commissioner of Patents and Trademarks*